United States Patent [19]
Hsien-Chung

[11] Patent Number: 5,375,831
[45] Date of Patent: Dec. 27, 1994

[54] ADJUSTABLE CONTROL BOARD FOR TV GAMES

[76] Inventor: Huang Hsien-Chung, No. 192, Ming Tur Rd., Chung Li City, Taoyuan, Taiwan, Prov. of China

[21] Appl. No.: 151,286

[22] Filed: Nov. 12, 1993

[51] Int. Cl.$^5$ .............................................. A63B 71/00
[52] U.S. Cl. ................................................. 273/148 B
[58] Field of Search ................... 273/148 B, 434, 438, 273/85 G; 345/156, 157

[56] References Cited

U.S. PATENT DOCUMENTS

| | | | |
|---|---|---|---|
| 4,469,330 | 9/1984 | Asher | 273/148 B |
| 4,630,823 | 12/1986 | Grant | 273/148 B |
| 5,011,149 | 4/1991 | Purnell | 273/148 B |
| 5,207,426 | 5/1993 | Inoue et al. | 273/148 B |
| 5,207,791 | 5/1993 | Scherbarth | 273/148 B |

*Primary Examiner*—Vincent Millin
*Assistant Examiner*—Raleigh W. Chiu
*Attorney, Agent, or Firm*—W. Wayne Liauh

[57] ABSTRACT

An adjustable control board for TV games comprising, essentially, of a main body, a pair of accessory bodies attached to the left and right sides, respectively, of the main body, a coupling body extending from each of the accessory body, and a resilient frame. The coupling body is provided thereunder a plurality of V-toothed positioning grooves and positioning holes, and the resilient frame is provided on each of their left and right sides an arcuated projection for engaging into the V-toothed grooves. The resilient frame is fixed in the main body in such a manner that when the accessory bodies are moved, the resilient frame is pushed to jump into another V-toothed groove to become positioned therein. The main body is further provided on its bottom face a T-pin, which can be rotated and inserted into one of the positioning holes on the bottom face of the accessory bodies. The T-pin can be secured so as to fixedly adjust the overall length of the game control board to provide increased stability during game playing and the convenience of reduced space during storage.

3 Claims, 6 Drawing Sheets

ADJUSTABLE CONTROL BOARD FOR TV GAMES

FIELD OF THE INVENTION

This invention relates to an adjustable control board for TV games which consists, essentially, of a main body and a pair of accessory bodies attached to the left and right sides, respectively, of the main body. The accessory bodies can be extended or retracted sideways so as to adjust the overall length for increased stability during operation such that the control board is better adapted for play and control.

BACKGROUND OF THE INVENTION

It is well-known in the an that conventional control boards for TV games can be divided into two main types: the palm or pocket type and the desktop type. As its name implies, a pocket size control board of the TV game is operated in the hands of the player by pressing various buttons provided thereon. The buttons include the "direction" buttons, the "firing" buttons, the "start" buttons, etc. However, since pocket size control boards are relatively inconvenient to operate and have relatively slow speed of response, the player must move his fingers very fast when pressing the direction buttons so as to be swirl to attack or dodge. But the body to be controlled is rather slow in response due to the fact that the fingers have to be moved fast to press the direction buttons. Moreover, the control board must be compact in order to be held in the hands during game operation and the direction buttons have to be designed in an even smaller size accordingly. The small size of the buttons makes it inconvenient to press, thus the conventional palm-sized control board is susceptible of pressing the wrong buttons. In addition, the body of the player responds with big moves during the "heated battles". The control boards of the palm type with their reduced size are operated with smaller moves such that the player may be less satisfied with the games and that is why the desktop control boards are introduced. The desktop control boards are larger in size and have larger direction, fire, and start buttons than the palm type control boards. However, the desktop type control boards also are operated by moving the fingers just as in the case with the palm type control boards, causing the body to be controlled to respond at a slower speed such that the game can not be played to receive the most of the fun. In addition, a joystick is used alternatively to overcome the problem of the slow response to the body when the moves are controlled by the direction buttons. In general, the desktop type control boards are attached to the top of the desk by means of suction cups. Due to the small bottom area of the control board, the board may tip over because that the force exerted on the joystick during "heated battles" tends to exceed the suction force by the suction cups, such that the intended action time to dodge or attack may be missed. A large bottom area is not required for the control board in the case where a joystick is provided in combination with the board. Moreover, ifs control board is designed to have a large bottom area, they will take up large space, and thus will be inconvenient for storage. On the other hand, if they are designed to have a small bottom area, the suction cups have to spaced apart at short distances, causing the control boards to be easily tipped over due to the increased amount of force during the operation of the joystick. Therefore, this arrangement does not allow the players to enjoy themselves as fully as they should when playing the game.

The presently available control boards of the palm and the desktop types both have their disadvantages. That is, with the palm type, the players are unlikely to be fully satisfied with the operation of the buttons on the control board. In the case of the desktop type with operation controlled by a joystick, due to the small bottom area of the control board, and hence reduced distance from the base provided under the control board, if too much force is exerted and the suction cups are spaced apart at short distances (that is, with a reduced inertia to resist the force exerted thereon), the control board may easily tip over, the players may not enjoy themselves to the fullest extent. Moreover, if the bottom area of the control board is enlarged, it would become inconvenient for storage and would take up large space because of their increased size. In view of the above mentioned disadvantages, there has been a desire for an improved control board for TV games.

SUMMARY OF THE INVENTION

The present invention comprises a main body and a pair of accessory bodies provided on the left and right side, respectively, of the main body, a coupling body extending from each of the accessory bodies having provided thereon a plurality of positioning holes and V-toothed grooves, and a resilient frame. The resilient frame is provided on each of the left and fight side thereof with an arcuated projection for engaging into the V-toothed positioning grooves. When the accessory bodies are extended or retracted and the resilient frame is positioned, the main and the accessory bodies can be fixed by threading a T-pin into the positioning hole on the accessory bodies. Moreover, the suction cups provided under the accessory bodies serve to enlarge the distance between the accessory bodies when they are extended out, thus reducing the tendency of the control board to tip over for easier operation, and making it possible for the players to enjoy the most of the fun in playing the games.

Accordingly, the primary object of the present invention is to provide a control board for TV games comprising a main body and a pair of accessory bodies provided on the left and right side of the main body, having provided thereunder with positioning holes, and V-toothed positioning grooves. By having a resilient frame provided in the V-toothed positioning groove, the accessory bodies can be positioned by the resilient frame such that once the accessory bodies are extended or retracted, they can not be slid arbitrarily.

Another object of the present invention is provide an improved control board for TV games in which the accessory bodies, after being extended or retracted, can be fixed in position by having the T-pin on the main body threaded into the positioning hole.

BRIEF DESCRIPTION OF THE DRAWINGS

Other objects, features and advantages of the present invention will become apparent from the following detailed description of the preferred embodiments taken in conjunction with the accompanying drawings, in which.

DETAILED DESCRIPTION OF THE PREFERRED EMBODIMENT

Figure 1:
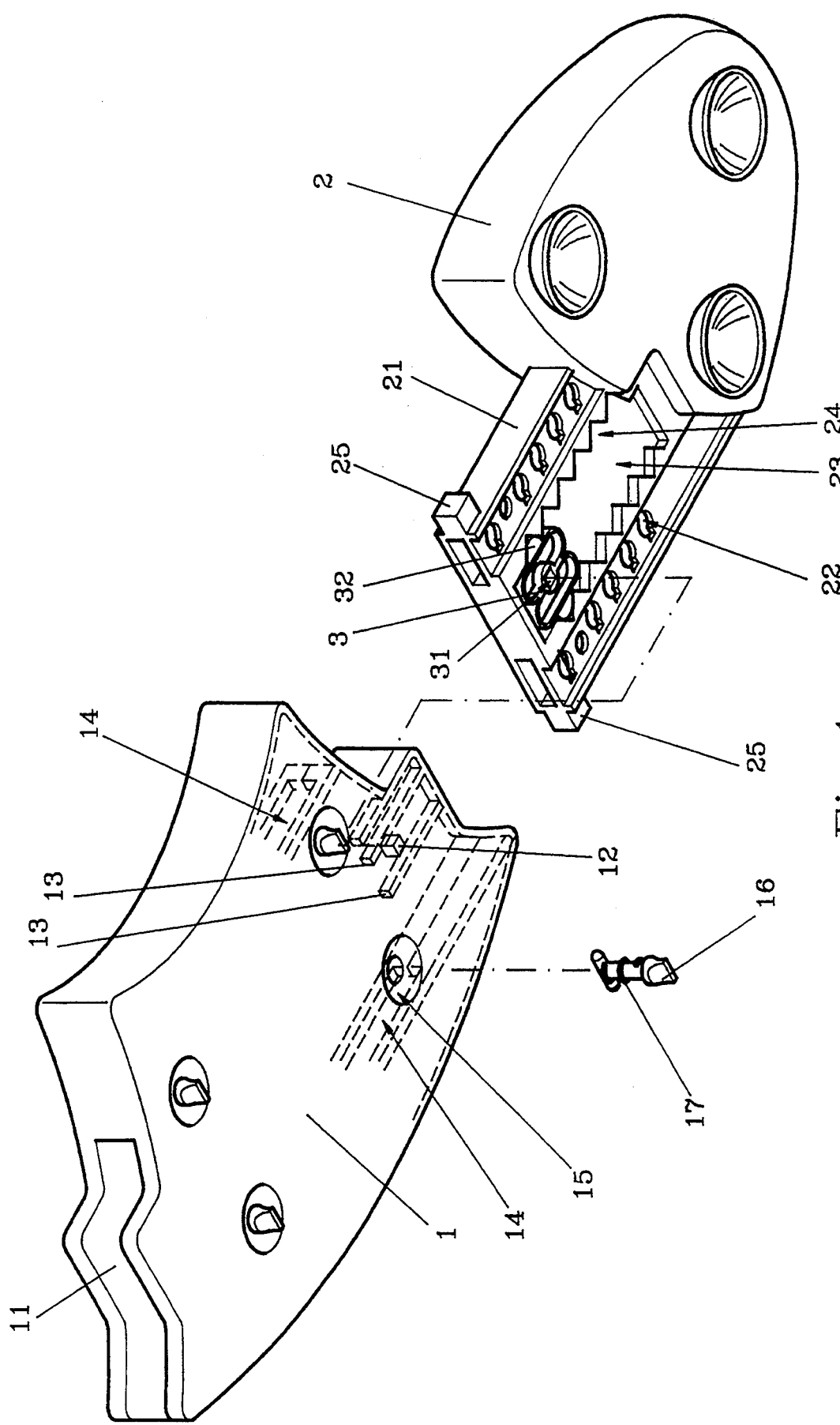
FIG. 1 is perspective view of the present invention as seen from above at an angle from the vertical direction.
Figure 2:
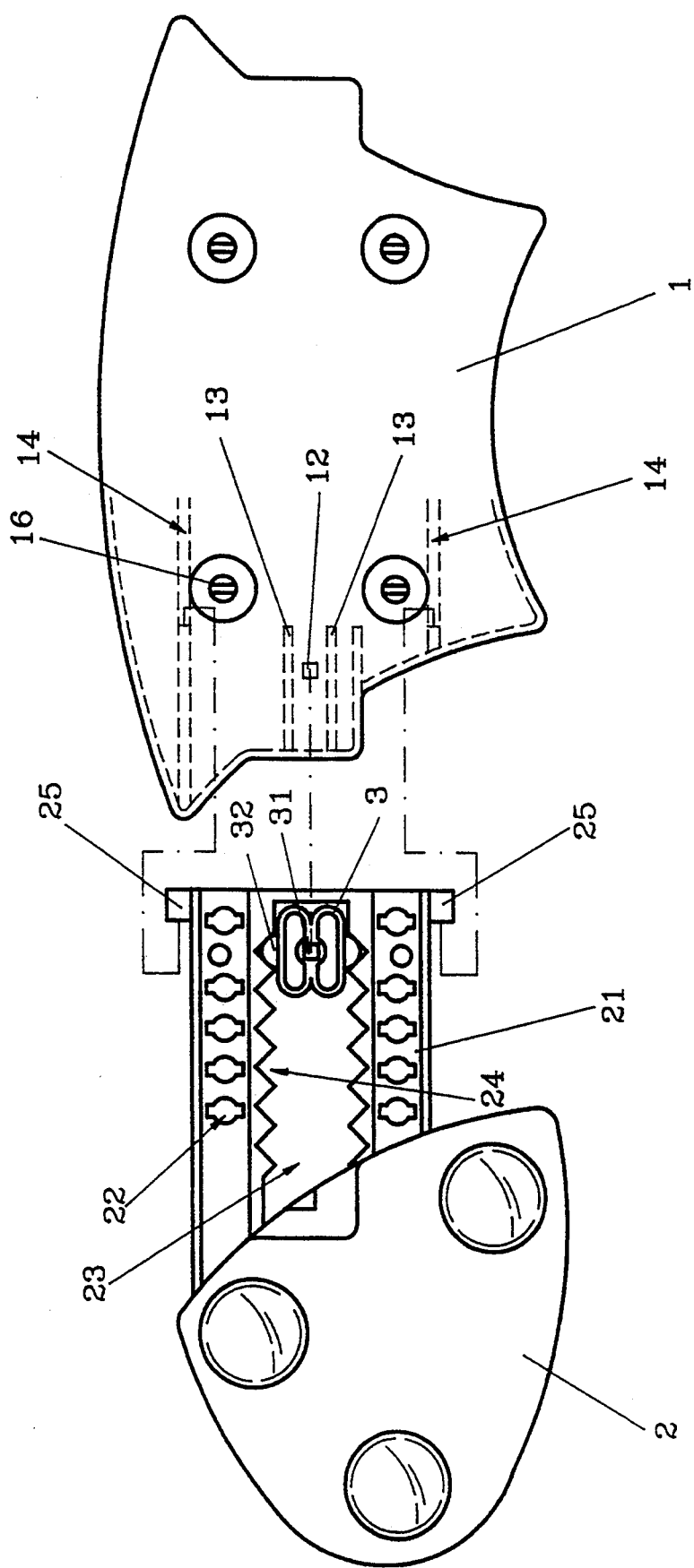
FIG. 2 is plan view of the present invention showing the assembly of an accessory body and the main body.

First referring to FIGS. 1 and 2, the control board of the present invention is comprised, [in essential] essentially, of a main body I and a pair or accessory bodies 2 provided on the left and right sides, respectively, of the main body 1.

The main body 1 is provided on the left and right sides each with an opening 11, a square retaining block 12 being disposed at an appropriate position on the bottom side of the opening 11. As shown in FIG. 2, the vertical opening 11 is provided with a guide bar 13 on each of the two sides of the square retaining block 12. The parallel guide bars 13 are positioned in the main body 1 and a pair of guide grooves 14 are provided at the upper and lower sides thereof. A plurality of hole seats 15 are provided at appropriate positions on the lower portion of the main body, a T-pin 16 is threaded in the hole seats 15, and a spring 17 is fitted between the t-shaped end and the head of the pin.

A coupling body 21 is extended from each of the accessory bodies 2. The accessory bodies 2 are adapted to be inserted into the opening 11 of main body 1. A plurality of positioning holes 22 are arranged along the upper and lower sides of the coupling body 21, and a groove frame 23 is provided in the middle portion of the coupling body 21 having provided on the upper and lower inside edges thereof a plurality of V-toothed positioning grooves 24. A guide block 25 is provided on each of the upper and lower sides of the front end portion of the coupling body 21. The guide blocks 25 are sliably inserted into the guide grooves 14 of the main body 1, such that the accessory bodies 2 and the main body 1 can be slidably moved relative to each other. In addition, a resilient frame 3 is provided within the groove frame 23, and a square retaining hole 31 is provided at the middle position on the resilient frame 3 for fitting over the square retaining block 12 in the main body 1 so as to allow the accessory bodies to be combined integrally with the main body 1. The upper and lower sides of the resilient frame 3 are each provided with an arcuated projection 32 for engaging into the V-toothed positioning grooves 24 such that the main body I and the accessory bodies 2 can be secured to position after they are extended or retracted relative to each other. Moreover, the positioning holes 22 are in the shape of " " such that the T-pin 16 can be inserted thereinto and then rotated to secure, or rotated then to pull out.

Figure 3:
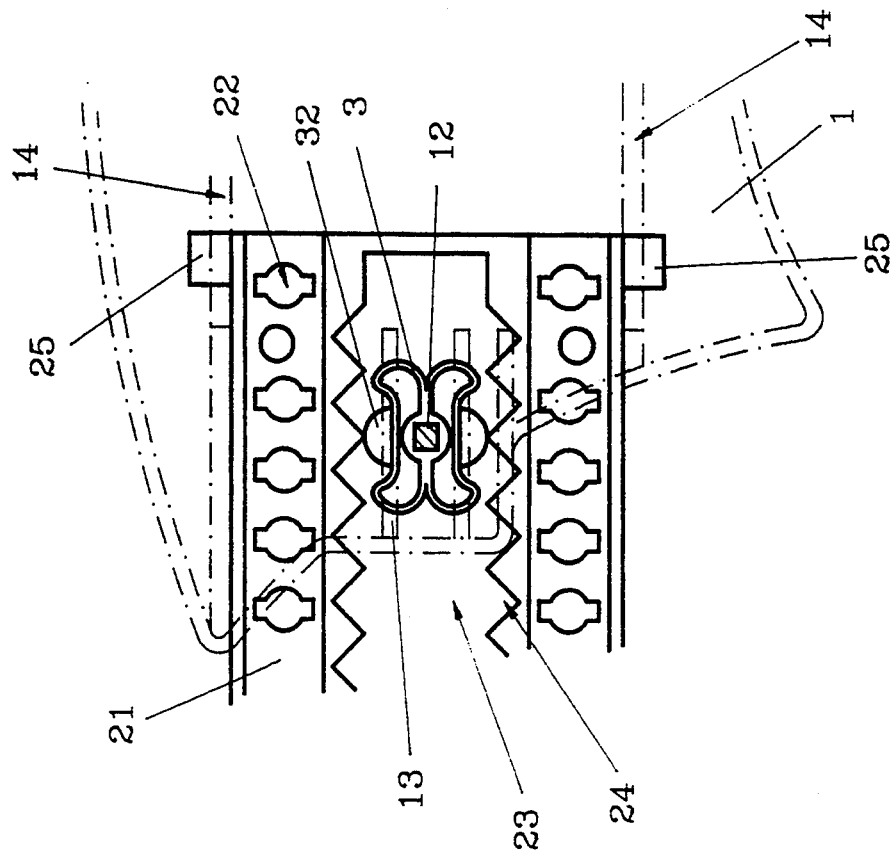
FIG. 3 is a fragmentary view of an embodiment according to the present invention showing the assembly of an accessory body and the main body.
Figure 4:
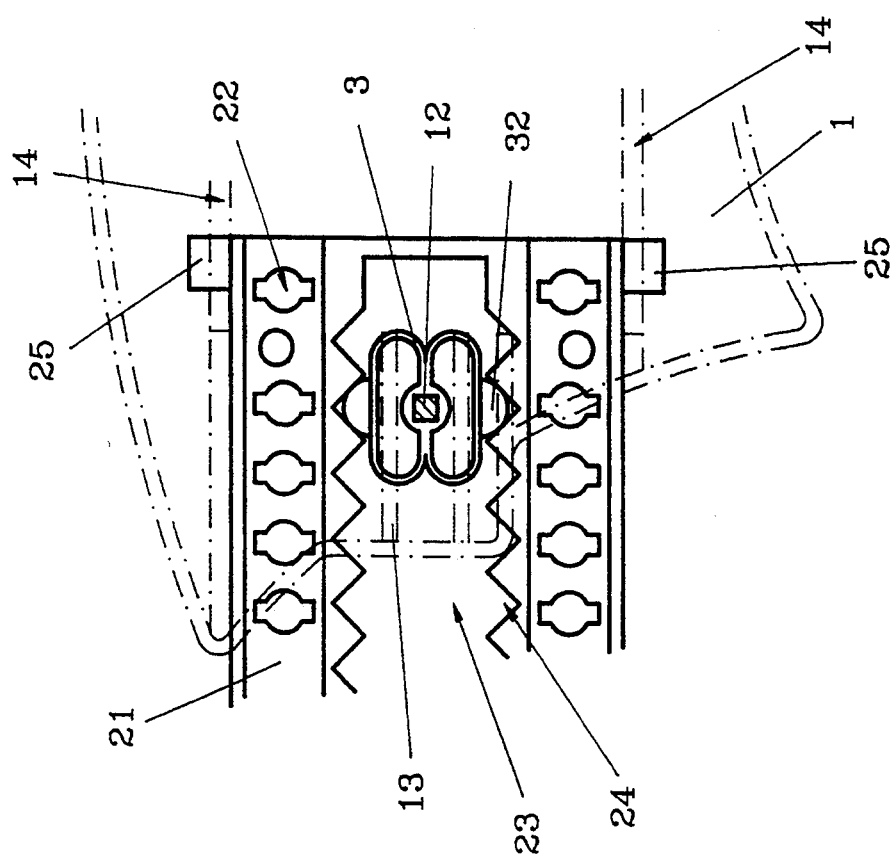
FIG. 4 is a fragmentary view of another embodiment according to the present invention showing the assembly of an accessory body and the main body.
Figure 5:
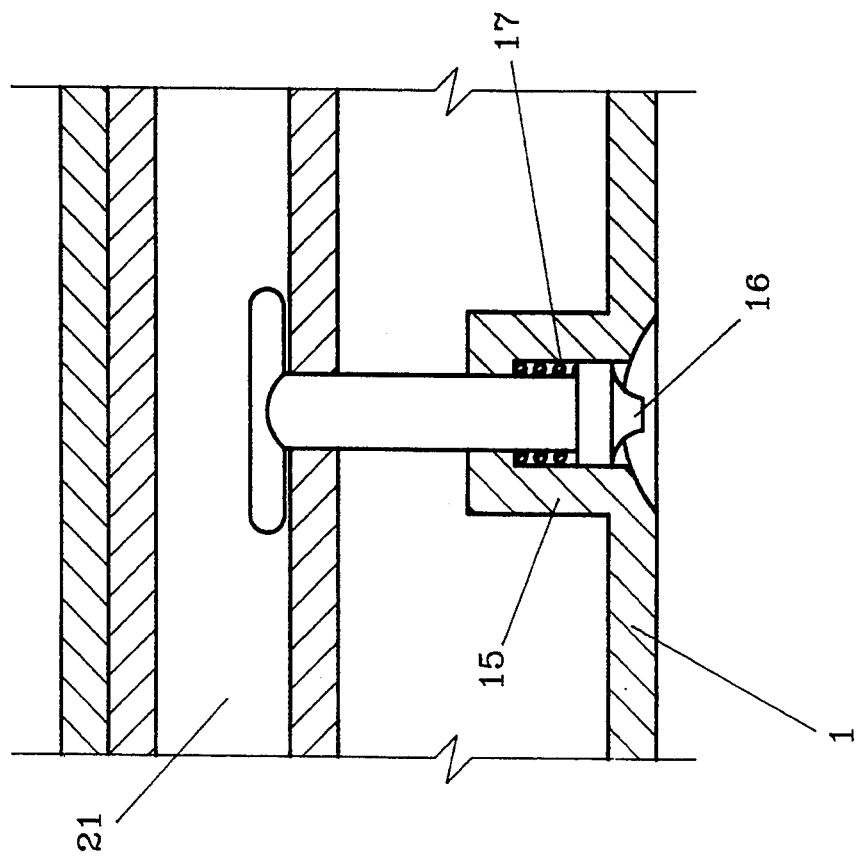
FIG. 5 is a fragmentary view of an embodiment according to the present invention showing the positioning of the T-pin.
Figure 6:
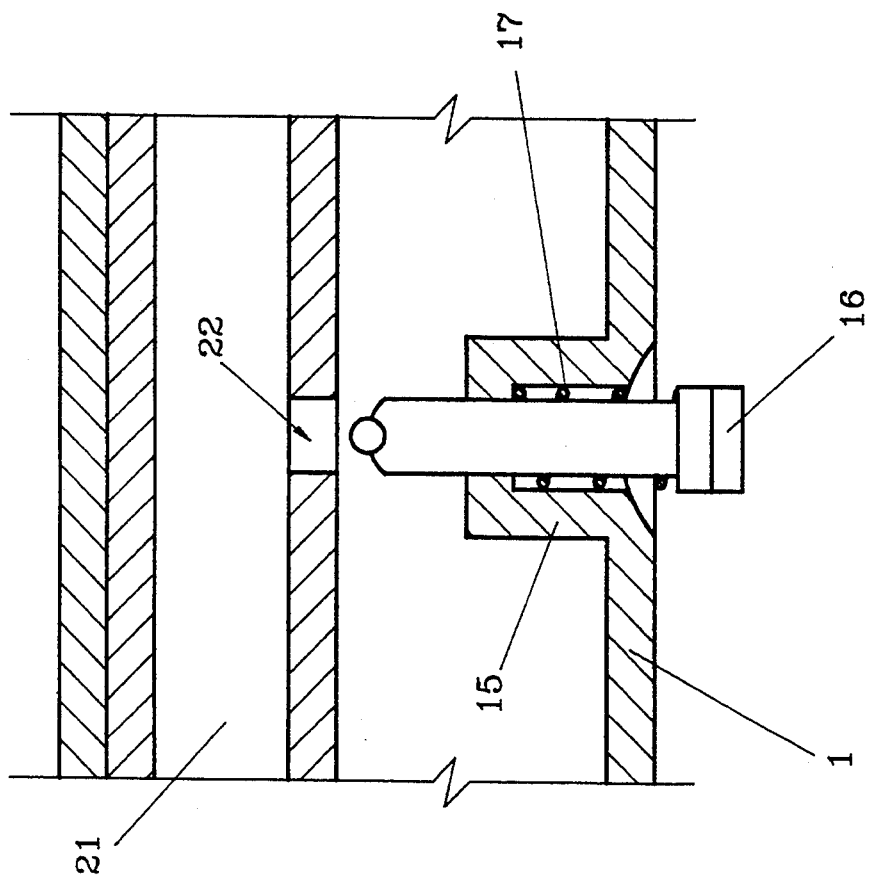
FIG. 6 is a fragmentary view of another embodiment according to the present invention showing the positioning of the T-pin.

According to the structure described above, as shown in FIGS. 3 and 4, the resilient frame 3 is securely mounted on the square retaining block 12 of the main body I such that when the accessory bodies 2 are extended or retracted, the resilient frame 3 will be pushed to move. The arcuated projection 32 provided on both sides of the resilient frame 3 will be displaced along the end face of the V-toothed positioning grooves 24 due to the resiliency of the V-toothed positioning grooves 24, causing the resilient frame 3 to retract inwardly. Once passing over the highest point of the V-toothed positioning grooves 24, the arcuated projection 32 becomes rebounded outwardly as shown in FIG. 3. When the arcuated projection is further displaced, it will be in the position as shown in FIG. 4, and become rebounded outwardly into position, thus causing the main body 1 and the accessory bodies 2 to be positioned properly such that they will not slide arbitrarily when they are extended or retracted during the position adjustment. The main body 1 and the accessory bodies 2 can thus be conveniently fixed by means of the T-pin 16. Referring to FIGS. 5 and 6, to secure the main body 1 and the accessory bodies 2, the T-pin 16 is pressed and rotated with the T-shaped end being in alignment with the projected hole seat of the positioning hole 22, causing the T-shaped end of the T-pin 16 to pass through the positioning hole 22 and then rotated for 90 degrees, thus to complete the fixing procedure. On the other hand, when the accessory bodies 2 are retracted or extended again, the T-pin 16 is first rotated for 90 degrees, causing the T-pin 16 to be pulled out of the positioning holes 22, and then the accessory bodies 2 can be pulled for repositioning.

Figure 7:
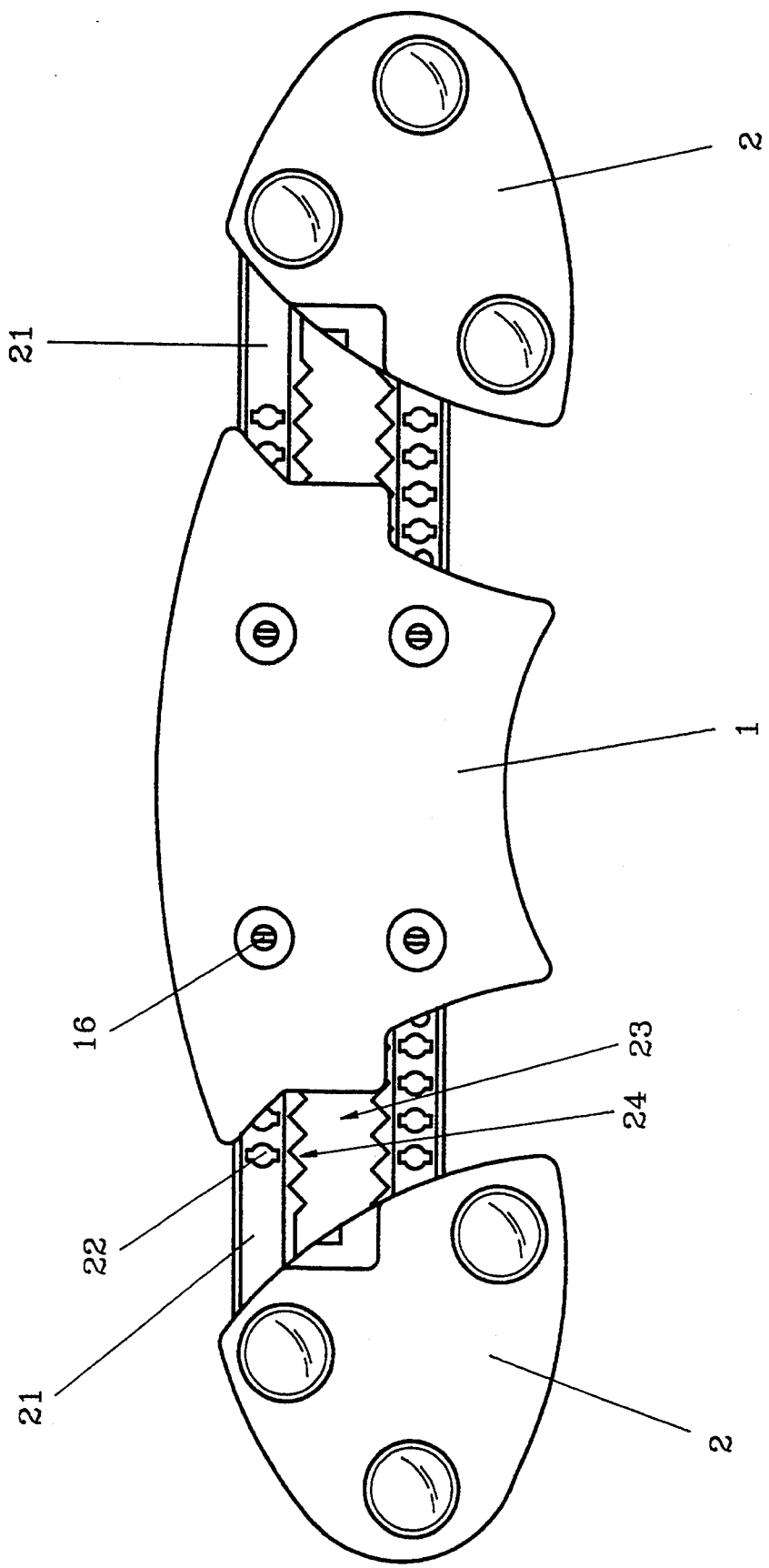
FIG. 7 is a view of an embodiment according to the present invention showing the accessory bodies in fully extended position.
Figure 8:
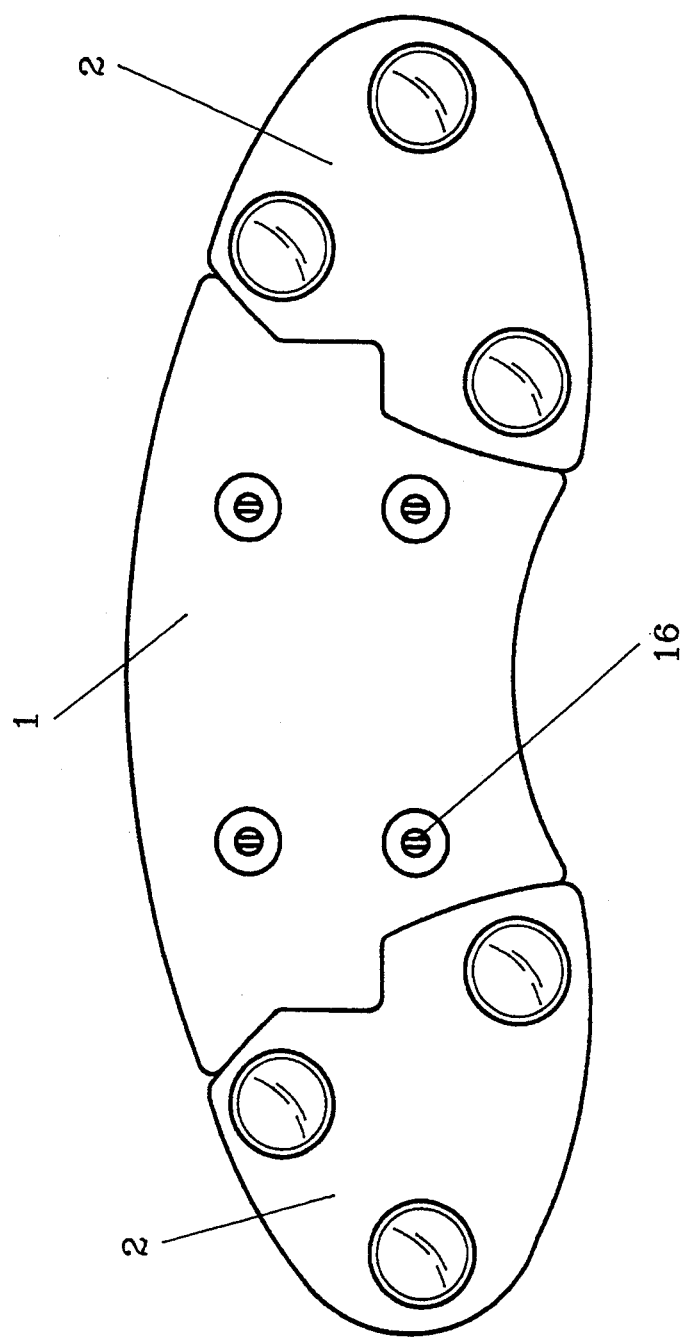
FIG. 8 is a front elevation view of the embodiment according to the present invention showing the accessory bodies in retracted position.

Referring to FIG. 7, when the accessory bodies 2 are extended to their outermost positions, the distance between the accessory bodies 2 is enlarged, thus giving increased resistant moment of force such that a greater resistant force will be resulted when a stronger force is exerted. Therefore, the control board will not be easily tipped over thus making it possible for the players to enjoy the most of the fun in playing the games.

From the foregoing, while an improved control board for TV games according to the present invention has been described, it is to be noted that the embodiments described hereinbefore are only illustrative and modifications and changes of the embodiments, as well as other embodiments can be readily occurred to those skilled in the art. Therefore, the present invention is intended to cover all such modifications, changes, and embodiments falling within the scope as defined in the appended claims.

I claim:

1. An adjustable control board for TV games comprising:
a main body having an upper portion, a lower portion, a left side and a right side, each of said left and right sides being provided with an opening having an inner end, a square retaining block disposed at an appropriate position on the inner end of each of the openings, a pair of guide bars disposed above and below, respectively, the square retaining block, the parallel guide bars being positioned inside the main body, a pair of guide grooves provided also above and below, respectively, the pair of parallel guide bars, a plurality of hole seats on the lower portion of the main body, a T-pin adapted to be inserted into each of the hole seats, and a spring fitted over the T-pin;

a pair of accessory bodies to be inserted into the openings on the left side and right side, respectively, of the main body, a pair of coupling bodies, each having a middle portion, a first upper side and a first lower side, and being extended from each of the accessory bodies, each of the first upper side and the first lower side of the coupling bodies having a front end portion, a plurality of positioning holes arranged along the first upper and lower sides of the coupling body, a groove frame in the middle portion of the coupling body having upper and lower inside edges, a plurality of V-toothed positioning grooves on the upper and lower insides edges of the groove frame, a guide block on the front end portion of each of the first upper and lower sides of the coupling body, the guide blocks being adapted to respectively and slidably inserted into the guide grooves of the main body; and a resilient frame in each of the coupling bodies, each resilient frame having a second upper side and a second lower side and being adapted to fit over the square retaining block in the main body, the resident frame containing a square retaining hole provided at a middle position thereof for fitting over the square retaining block, each of the second upper and lower sides of the resilient frame being provided with an arcuate projection for engaging with the V-toothed positioning grooves 2. The adjustable control board for TV games according to claim 1 wherein each of the T-pins has a T-shaped end to be inserted into one of the hole seats on the main body and a pin head, the T-pin also has a spring fitted between the T-shaped end and the pin head so as to allow the T-pin to bounce up automatically when the T-pin is being pulled back, the spring is further adapted so that the T-shaped end does not bounce beyond the seat hole to thereby prevent the T-pin from falling off.

3. The adjustable control board for TV games according to claim 2 wherein the positioning holes are in the shape of having a circular center with two short bars extended therefrom so as to allow the T-pin to be inserted thereinto and secure the T-pin after it is rotated beyond the width of the short bars.

* * * * *